(12) United States Patent
Zhao et al.

(10) Patent No.: US 11,900,157 B2
(45) Date of Patent: Feb. 13, 2024

(54) HYBRID VIRTUAL GPU CO-SCHEDULING

(71) Applicant: Intel Corporation, Santa Clara, CA (US)

(72) Inventors: Yan Zhao, Shanghai (CN); Zhi Wang, Tampere (FI); Weinan Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 299 days.

(21) Appl. No.: 17/058,309

(22) PCT Filed: Sep. 19, 2018

(86) PCT No.: PCT/CN2018/106466
§ 371 (c)(1),
(2) Date: Nov. 24, 2020

(87) PCT Pub. No.: WO2020/056620
PCT Pub. Date: Mar. 26, 2020

(65) Prior Publication Data
US 2021/0216365 A1    Jul. 15, 2021

(51) Int. Cl.
*G06F 9/48*     (2006.01)
*G06F 9/50*     (2006.01)
*G06F 9/30*     (2018.01)

(52) U.S. Cl.
CPC .......... *G06F 9/4881* (2013.01); *G06F 9/3004* (2013.01); *G06F 9/30079* (2013.01); *G06F 9/505* (2013.01); *G06F 9/5077* (2013.01)

(58) Field of Classification Search
None
See application file for complete search history.

(56) References Cited

U.S. PATENT DOCUMENTS

| | | | | |
|---|---|---|---|---|
| 8,533,698 | B2 * | 9/2013 | Zhu | G06F 8/451 717/149 |
| 8,669,990 | B2 * | 3/2014 | Sprangle | G06F 9/3877 712/205 |
| 8,719,839 | B2 * | 5/2014 | Yan | G06F 9/544 719/331 |
| 8,997,113 | B2 * | 3/2015 | Yan | G06F 9/3863 719/331 |
| 9,495,720 | B2 * | 11/2016 | Kim | G06T 1/20 |

(Continued)

FOREIGN PATENT DOCUMENTS

| | | |
|---|---|---|
| CN | 107329818 A | 11/2017 |
| CN | 108228351 A | 6/2018 |
| WO | 2018063580 A1 | 4/2018 |

OTHER PUBLICATIONS

Hong et al.; "FairGV: Fair and Fast GPU Virtualization"; IEEE Transactions on Parallel and Distributed Systems, vol. 28, No. 12, Dec. 2017; (Hong_2017.pdf; pp. 3472-3485) (Year: 2017).*

(Continued)

*Primary Examiner* — Hiren P Patel
(74) *Attorney, Agent, or Firm* — Jordan IP Law, LLC

(57) ABSTRACT

An embodiment of a semiconductor package apparatus may include technology to manage one or more virtual graphic processor units, and co-schedule the one or more virtual graphic processor units based on both general processor instructions and graphics processor instructions. Other embodiments are disclosed and claimed.

21 Claims, 10 Drawing Sheets

(56) References Cited

U.S. PATENT DOCUMENTS

| | | | | |
|---|---|---|---|---|
| 10,133,597 B2* | 11/2018 | Tian | | G06F 9/455 |
| 10,410,311 B2* | 9/2019 | Vembu | | G06T 1/20 |
| 10,430,991 B2* | 10/2019 | Ma | | G06T 15/60 |
| 10,497,087 B2* | 12/2019 | Vembu | | G06T 15/005 |
| 11,113,093 B2* | 9/2021 | Xu | | G06F 11/301 |
| 11,720,408 B2* | 8/2023 | Sivaraman | | G06N 20/00 |
| | | | | 718/104 |
| 2010/0045682 A1* | 2/2010 | Ford | | G06F 9/30181 |
| | | | | 345/502 |
| 2011/0057940 A1* | 3/2011 | Mantor | | G06T 1/00 |
| | | | | 345/545 |
| 2011/0157195 A1* | 6/2011 | Sprangle | | G06F 9/3877 |
| | | | | 345/522 |
| 2012/0075316 A1* | 3/2012 | Kim | | G06F 8/47 |
| | | | | 345/522 |
| 2013/0297919 A1* | 11/2013 | Kang | | G06F 8/452 |
| | | | | 712/241 |
| 2014/0078159 A1* | 3/2014 | Sprangle | | G06T 1/20 |
| | | | | 345/522 |
| 2015/0028454 A1* | 1/2015 | Cheng | | H01L 29/785 |
| | | | | 438/478 |
| 2015/0113255 A1* | 4/2015 | Yan | | G06F 9/3863 |
| | | | | 712/228 |
| 2015/0371354 A1 | 12/2015 | Petersen et al. | | |
| 2016/0189332 A1* | 6/2016 | Yoo | | G06F 3/14 |
| | | | | 345/156 |
| 2016/0292816 A1* | 10/2016 | Dong | | G06F 9/455 |
| 2017/0162447 A1* | 6/2017 | Glass | | H01L 21/823821 |
| 2018/0011729 A1* | 1/2018 | Yu | | G06F 9/4843 |
| 2018/0293701 A1* | 10/2018 | Appu | | G06F 9/5038 |
| 2019/0228557 A1* | 7/2019 | Ma | | G06T 15/005 |

OTHER PUBLICATIONS

Sajjapongse et al.; "A Flexible Scheduling Framework for Heterogeneous CPU-GPU Clusters"; University of Missouri—Columbia; IEEE 2014; (Sajjapongse_2014.pdf; pp. 1-11) (Year: 2014).*

Tian et al.; "A Full GPU Virtualization Solution with Mediated Pass-Through"; 2014 USENIX Annual Technical Conference; (Tian_2004.pdf; pp. 1-13) (Year: 2004).*

Xue et al.; "Scalable GPU Virtualization with Dynamic Sharing of Graphics Memory Space"; IEEE Transactions on Parallel and Distributed Systems, vol. 29, No. 8, Aug. 2018; (Xue_2018.pdf; pp. 1823-1836) (Year: 2018).*

Zhu et al.; "Co-Run Scheduling with Power Cap on Integrated CPU-GPU Systems"; 2017 IEEE International Parallel and Distributed Processing Symposium; (Zhu_2017.pdf; pp. 967-977) (Year: 2017).*

Hong et al.; "GPU Virtualization and Scheduling Methods: A Comprehensive Survey"; ACM Comput. Surv. 50, 3, Article 35 (Jun. 2017); DOI: http://dx.doi.org/10.1145/3068281; (Hong_2017.pdf; pp. 1-37) (Year: 2017).*

Chen et al.; "EffiSha: A Software Framework for Enabling Efficient Preemptive Scheduling of GPU"; 2017 ACM; DOI: http://dx.doi.org/10.1145/3018743.3018748; (Chen_2017.pdf; pp. 3-16) (Year: 2017).*

International Search Report and Written Opinion for International Patent Application No. PCT/US2018/106466, dated Jun. 25, 2019, 5 pages.

* cited by examiner

HYBRID VIRTUAL GPU CO-SCHEDULING

CROSS REFERENCE TO RELATED APPLICATIONS

The present application is a U.S. National Phase Patent Application, which claims the benefit of priority to International Patent Application No. PCT/CN2018/106466 filed on Sep. 19, 2018.

TECHNICAL FIELD

Embodiments generally relate to graphics systems. More particularly, embodiments relate to hybrid virtual graphics processor unit (vGPU) co-scheduling.

BACKGROUND

A server or cloud service provider (CSP) may host multiple applications from different users on a same hardware platform. Some servers/CSPs may utilize virtualization technology to support the multiple applications and/or different users. Access to virtual resources may be managed with scheduling technology.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
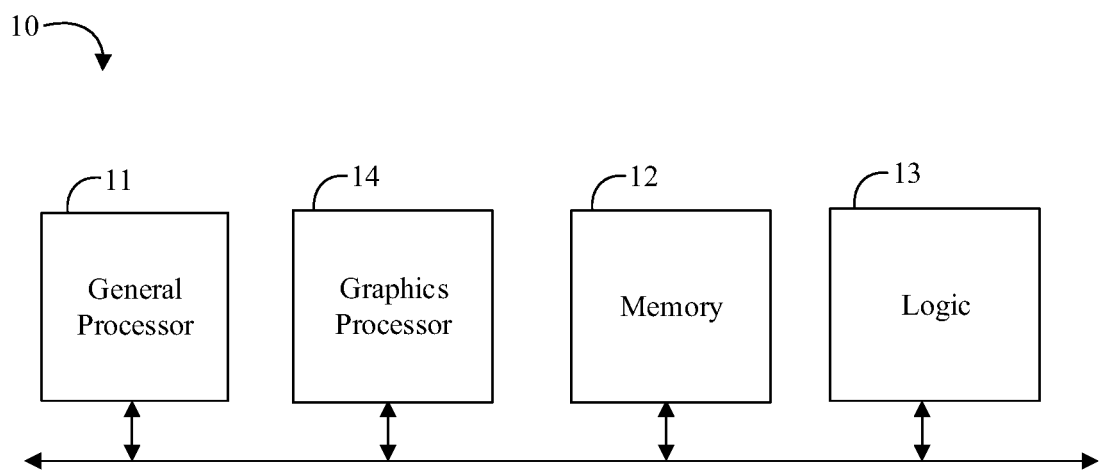
FIG. 1 is a block diagram of an example of an electronic processing system according to an embodiment.

Turning now to FIG. 1, an embodiment of an electronic processing system 10 may include a general processor 11, a graphics processor 14, memory 12 communicatively coupled to the general processor 11 and the graphics processor 14, and logic 13 communicatively coupled to the general processor 11 and the graphics processor 14 to manage one or more vGPUs, and co-schedule the one or more vGPUs based on both general processor instructions and graphics processor instructions. In some embodiments, the logic 13 may be further configured to map schedule information into a graphics memory space, and share the mapped schedule information in the graphics memory space between the general processor 11 and the graphics processor 14. For example, the schedule information may include one or more of workload queue information and schedule account information. In some embodiments, the logic 13 may be further configured to generate a shadow virtual graphics processor workload, and insert a graphics processor schedule stub at the end of the shadow virtual graphics processor workload. For example, the logic 13 may be configured to co-schedule based on graphics processor instructions when the graphics processor schedule stub is reached in the workload, and update schedule account information in the graphics memory space based on one or more of graphics memory space access instructions and graphics processor pipeline instructions. The logic 13 may also be configured to co-schedule based on general processor instruction after the graphics processor 14 becomes idle. In some embodiments, the logic 13 may be located in, or co-located with, various components, including the general processor 11 and/or graphics processor 14 (e.g., on a same die).

Embodiments of each of the above general processor 11, memory 12, logic 13, graphics processor 14, vGPUs, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the general processor 11 may include a general purpose processor, a central processor unit (CPU), a controller, a micro-controller, etc. Embodiments of the graphics processor 14 may include a special purpose processor, a graphics processor unit (GPU), a controller, a micro-controller, etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#or the like and conventional procedural programming languages, such as the "C" programming language or similar programming languages. For example, the memory 12, persistent storage media, or other system memory may store a set of instructions which when executed by the general processor 11 and/or the graphics processor 14 cause the system 10 to implement one or more components, features, or aspects of the system 10 (e.g., the logic 13, managing the vGPUs, co-scheduling the vGPUs based on both general processor instructions and graphics processor instructions, etc.).

Figure 2:
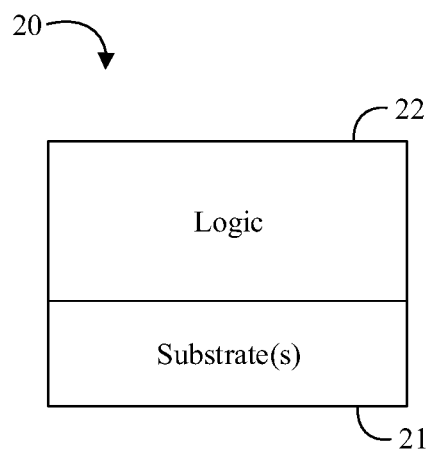
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates may be configured to manage one or more vGPUs, and co-schedule the one or more vGPUs based on both general processor instructions and graphics processor instructions. In some embodiments, the logic 22 may be further configured to map schedule information into a graphics memory space, and share the mapped schedule information in the graphics memory space between a general processor and a graphics processor. For example, the schedule information may include one or more of workload queue information and schedule account information. In some embodiments, the logic 22 may be further configured to generate a shadow virtual graphics processor workload, and insert a graphics processor schedule stub at the end of the shadow virtual graphics processor workload. For example, the logic 22 may be configured to co-schedule based on graphics processor instructions when the graphics processor schedule stub is reached in the workload, and update schedule account information in the graphics memory space based on one or more of graphics memory space access instructions and graphics processor pipeline instructions. The logic 22 may also be configured to co-schedule based on general processor instruction after the graphics processor becomes idle. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#or the like and conventional procedural programming languages, such as the "C" programming language or similar programming languages.

The apparatus 20 may implement one or more aspects of the method 30 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
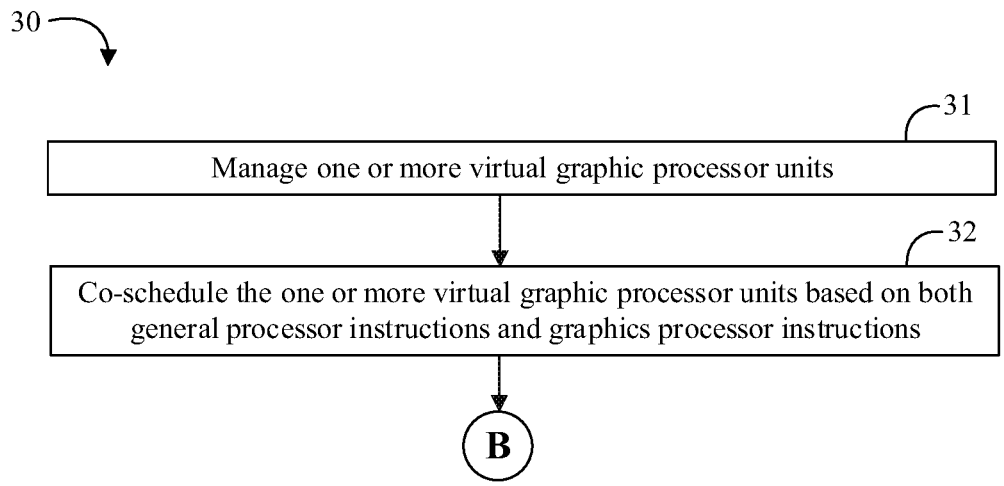
FIGS. 3A to 3C are flowcharts of an example of a method of co-scheduling a virtual graphics processor according to an embodiment.
Figure 3B:
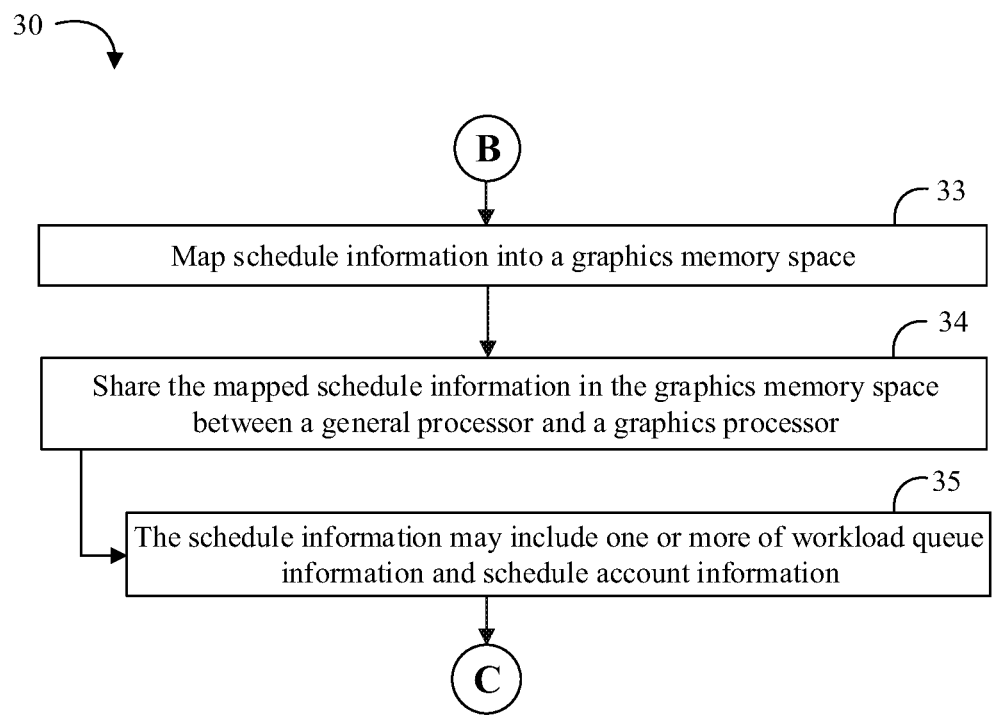
Figure 3C:
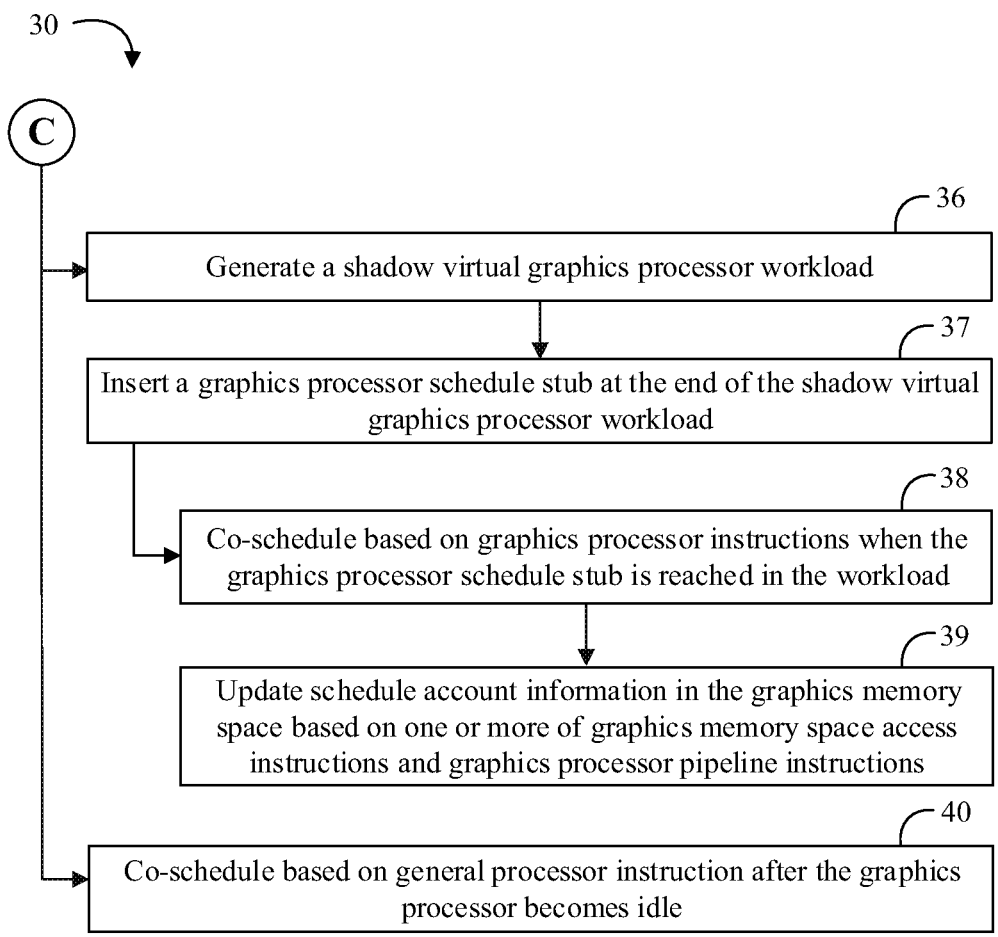

Turning now to FIGS. 3A to 3C, an embodiment of a method 30 of co-scheduling a virtual graphics processor may include managing one or more virtual graphic processor units at block 31, and co-scheduling the one or more virtual graphic processor units based on both general processor instructions and graphics processor instructions at block 32. Some embodiments of the method 30 may further include mapping schedule information into a graphics memory space at block 33, and sharing the mapped schedule information in the graphics memory space between a general processor and a graphics processor at block 34. For example, the schedule information may include one or more of workload queue information and schedule account information at block 35. Some embodiments of the method 30 may further include generating a shadow virtual graphics processor workload at block 36, and inserting a graphics processor schedule stub at the end of the shadow virtual graphics processor workload at block 37. For example, the method 30 may include co-scheduling based on graphics processor instructions when the graphics processor schedule stub is reached in the workload at block 38, and updating schedule account information in the graphics memory space based on one or more of graphics memory space access instructions and graphics processor pipeline instructions at block 39. The method 30 may also include co-scheduling based on general processor instruction after the graphics processor becomes idle at block 40.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 20 to 25 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide hybrid vGPU scheduling technology based on CPU-GPU co-scheduling techniques in full GPU virtualization. For example, cloud service providers (CSPs) may prefer to improve GPU utilization to achieve larger scalability. Some CSPs may create more vGPUs, which involves running more vGPU workloads on one physical hardware platform. The CSPs may also prefer to maintain a satisfactory user experience and quality for all tenants. Another example of technology that may benefit from vGPUs may include in-vehicle-infotainment (IVI) technology. For example, the ACRN project (projectacrn.org) may include open-source reference internet-of-things (IoT) hypervisor technology for IVI applications running on a system-on-chip (SoC) platform. The ACRN project may include full GPU virtualization.

For some GPU virtualization technology, the vGPU scheduling techniques are generally based on either software-scheduling or hardware-scheduling. For vGPU scheduling technology based on software (SW), the scheduling algorithm runs on the CPU. When the scheduler comes to a scheduling point, the scheduling policies and algorithms running on the CPU will collect and update the scheduling accounting data, which will be used in the scheduling systems later. Then the scheduler will pick the next workload from the vGPU workload queue. The CPU has to interact with the GPU at a scheduling point, such as managing the GPU interrupts, submitting the next workload into GPU, etc.

For vGPU scheduling technology based on hardware (HW), the scheduling policies and algorithms are implemented inside the HW. The user can only choose the scheduling policies and algorithms among several policies and algorithms pre-built inside the firmware and the user is only able to tune a few limited scheduling options of the chosen policies and algorithms. The SW vGPU scheduling scheme provides flexible programmability. However, the GPU utilization of SW scheduling scheme may be worse than HW scheduling scheme because the GPU may stay idle when the CPU is processing the GPU interrupts and calculating the scheduling statistics, which brings a drop of scalability and CPU usage peak. The HW scheduling scheme provides better GPU utilization than the SW scheduling scheme because all the scheduling algorithms and policies are managed by HW. However, the programmability may be worse than a SW scheduling scheme.

Some embodiments may advantageously provide a hybrid vGPU scheduling technology based on a CPU-GPU co-scheduling technique. In some embodiments, workload queues and/or the scheduling accounting data may be mapped into the graphics memory space such that the workload/scheduling information may be shared between the CPU and the GPU. For example, a user's scheduling algorithms and policies may be implemented as both CPU and GPU instructions. During generation of a shadow vGPU workload, for example, a mediator (e.g., which may be responsible for submitting vGPU workloads) may insert a GPU scheduling stub at the end of each vGPU workload. When the GPU reaches a GPU scheduling point in the GPU pipeline, the GPU-command-implemented scheduling policies and algorithms may be executed by the GPU. The scheduling policies and algorithms implemented by GPU commands may collect and update the shared scheduling accounting data in the graphics memory by leveraging the instructions of graphics memory access and ALU instructions of GPU pipeline.

To fill the GPU pipeline as much as possible, the next vGPU workload may be loaded into the HW execution queue by the GPU from the vGPU workload queue in the graphics memory. When the GPU scheduling point is finished, the HW may immediately execute the next vGPU workload on the basis of the user's scheduling policies and algorithms. The mediator may update the workload queue if there is any incoming workload. In some embodiments, the GPU may automatically execute and schedule the incoming workload as long as there is an active GPU scheduling point in the GPU pipeline. The CPU-instruction-implemented scheduling policies and algorithms may be used in a newly submitted workload after the GPU goes into idle. For example, the device model may schedule the workload by itself because there is no active GPU scheduling point in the GPU pipeline.

By combining hardware scheduling schemes and software scheduling schemes, some embodiments of a hybrid vGPU scheduling scheme may provide both flexible programmability and better GPU utilization. For example, some embodiments may enable the user to develop their own flexible scheduling policies and algorithms to achieve the best scalability in their specific practical production environment. Compared with some other scheduling technology, some embodiments of a hybrid vGPU scheduling technology may fulfill important requirements from CSPs, which may benefit from a better and more flexible vGPU solution.

By offloading scheduling policies and algorithms to the GPU and reducing or eliminating the CPU usage peak in handling vGPU workload scheduling points, some embodiments of a hybrid vGPU scheduling technology may advantageously improve the system responsiveness in an IVI application based on a SoC with a low-end CPU core. With the improvement of system responsiveness and flexible programmability, the efforts of reaching the certifications of industry car standards, such as ISO26262, may also be reduced because the CPU has more time to execute critical tasks required by these certifications.

Figure 4:
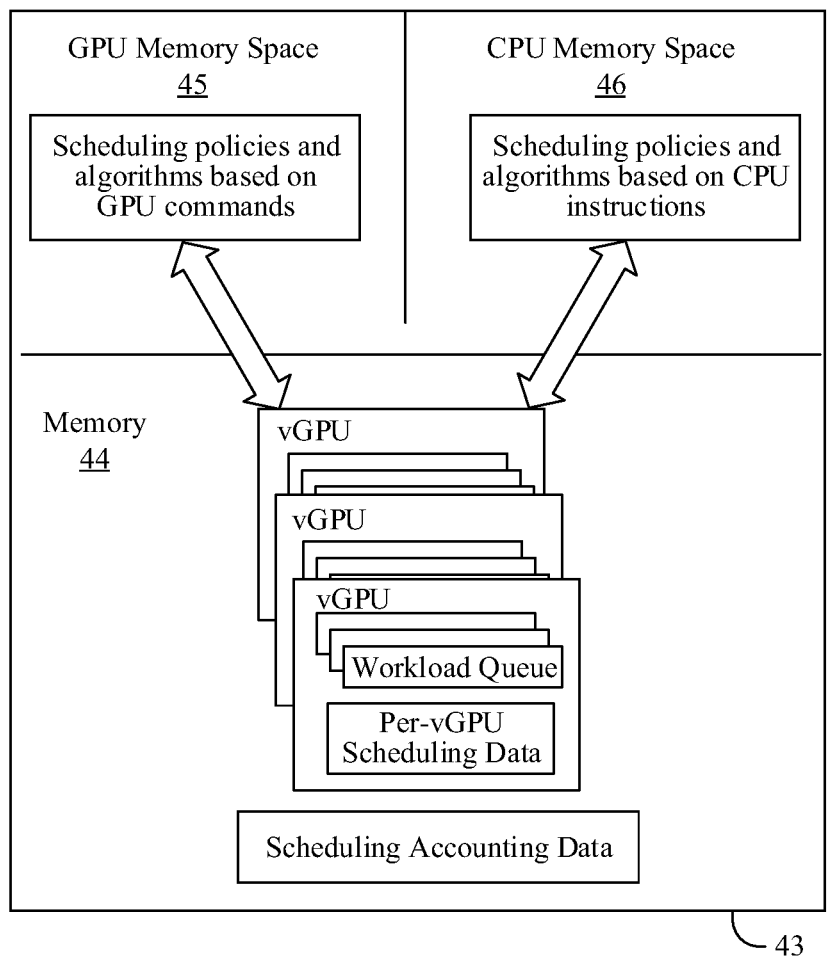
FIG. 4 is a block diagram of another example of an electronic processing system according to an embodiment.

Turning now to FIG. 4, an embodiment of an electronic processing system 42 may include a memory 43 physically or logically divided into a general memory space 44, a GPU memory space 45, and a CPU memory space 46. FIG. 4 shows an example of sharing workload queue(s) and scheduling accounting data between the CPU memory space 46 and the GPU memory space 45. To provide this example of a CPU-GPU co-scheduling scheme, two versions of vGPU scheduling algorithms and policies may be implemented including a GPU version and a CPU version. In some embodiments, a general graphics translation table (GGTT) may be used by both the GPU and the CPU to access a portion of the general memory space 44. For example, the workload queues and the scheduling accounting data may be mapped into the GGTT memory space, such that the scheduling accounting data and workload queue(s) may be shared between the CPU and the GPU.

The users' respective scheduling algorithms and policies may be implemented as both CPU and GPU instructions. The scheduling policies and algorithms implemented by GPU commands may collect and update the shared scheduling accounting data in the GGTT memory space. In some embodiments, a logical ring context area (LRCA) of an execution list (EXECLIST) of a next vGPU workload may be loaded into a HW execution queue by a GPU load register from memory (LRM) instruction. Then another GPU load register immediate memory mode (LRI) instruction may write the EXECLIST control register to trigger the HW execution queue loading. Because the GPU preemption is disabled at this time, the execution of scheduling would not be preempted out. After the scheduling is finished, the HW would load the next vGPU workload automatically. CPU-instruction-implemented scheduling policies and algorithms may be utilized in a newly submitted workload when the GPU is idle.

Figure 5:
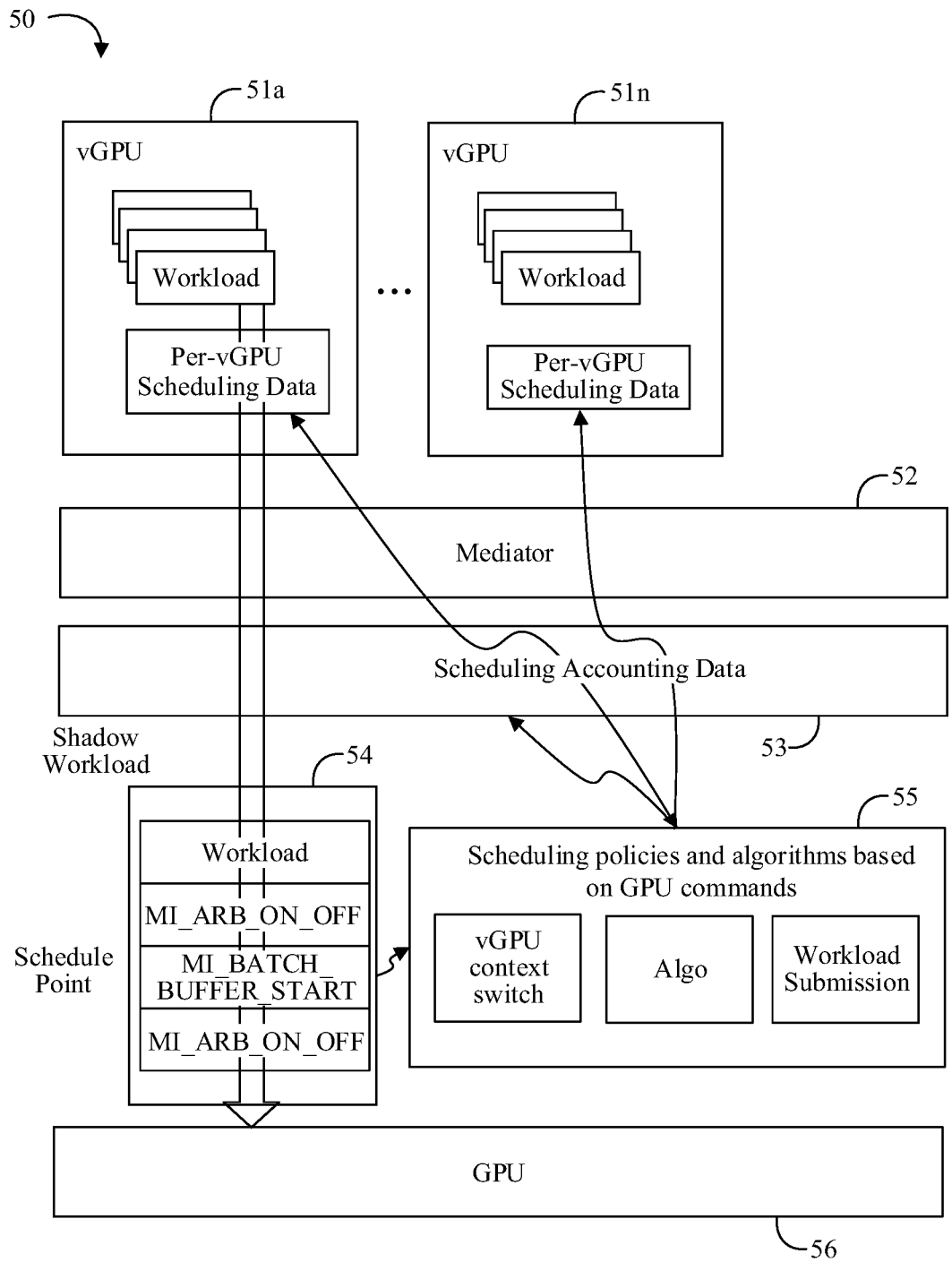
FIG. 5 is a block diagram of another example of an electronic processing system according to an embodiment.

Turning now to FIG. 5, an embodiment of an electronic processing system 50 may include one or more vGPUs 51*a* through 51*n*, a mediator 52, scheduling accounting data 53, a shadow workload 54, a GPU command-based version 55 of scheduling policies and algorithms, and a GPU 56, communicatively coupled as shown. An embodiment of the GPU version 55 of vGPU scheduling may be implemented in a privileged batch buffer. The GPU version 55 may contain the scheduling algorithms implemented by GPU ALU instructions. The mediator 52 may insert a MI_BATCH_BUFFER_START command to call the privileged batch buffer in each vGPU shadow workload.

When the GPU version 55 of vGPU scheduling is executed on the GPU 56, the GPU version 55 may save the accounting data of current vGPU by GPU graphics memory access commands to the scheduling accounting data 53, and then execute the scheduling algorithm. For example, the GPU version 55 of vGPU scheduling may load the current and previous CTX_TIMESTAMP registers into general purpose registers (GPRs) with several GPU LRR commands, and then use a MI_MATH command to calculate the time cost of the workload. When done, the GPU version 55 may save the calculated time cost into the shared scheduling accounting data 53 area with a GPU save register to memory (SRM) command. When the scheduling algorithm of the GPU version 55 is finished, the GPU version 55 may decide to schedule the next vGPU, in which case a vGPU context switch may be performed and the next workload from the target vGPU may be loaded.

Figure 6:
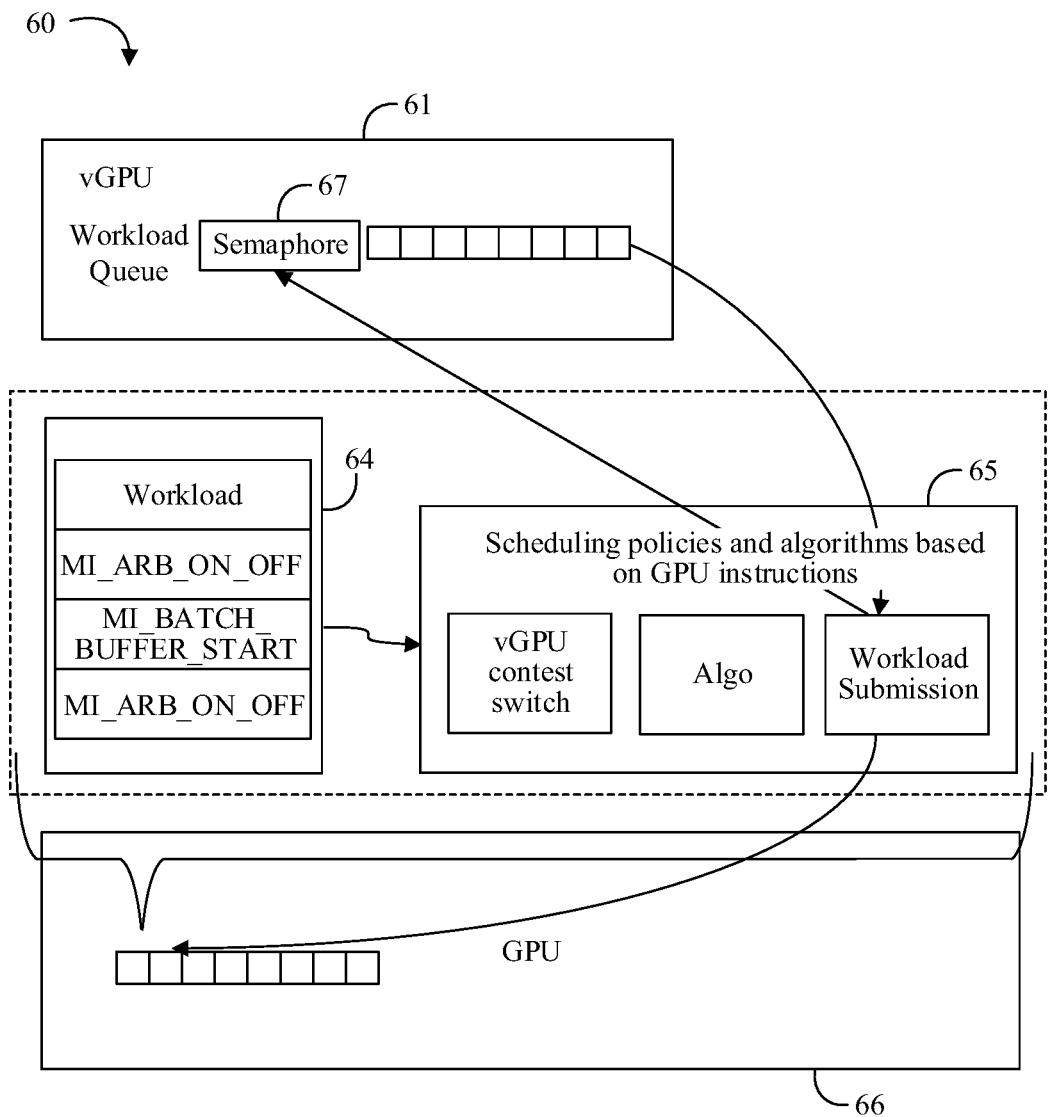
FIG. 6 is a block diagram of another example of an electronic processing system according to an embodiment.

Turning now to FIG. 6, an embodiment of an electronic processing system 60 may include one or more vGPUs 61, a shadow workload 64, a GPU version 65 of vGPU scheduling, and a GPU 66, communicatively coupled as shown. FIG. 6 shows an example of vGPU workload submission. To achieve the maximum scalability and reduce the extra synchronization between a CPU and the GPU 66, GPU scheduling code (e.g., a portion of the GPU version 65) may be responsible for loading the next vGPU workload from the workload queue in the GGTT memory space. For example, the GPU version 65 may use a LRM instruction to load the LRCA of the EXECLIST into the EXECLIST queue and use a LRI instruction to write the ELSP_LOAD bit of the EXECLIST control register, which would trigger the hardware to update the internal EXECLIST queue.

A mediator (not shown) may update the workload queue when the GPU is loading the workload one by one. To prevent any race condition of the workload queue reading from the GPU and the writing from the mediator, some embodiments may utilize a GPU semaphore 67. To append a new workload into the workload queue, the mediator may hold the semaphore 67. To read the workload queue, the GPU 66 may wait for the semaphore 67.

Figure 7:
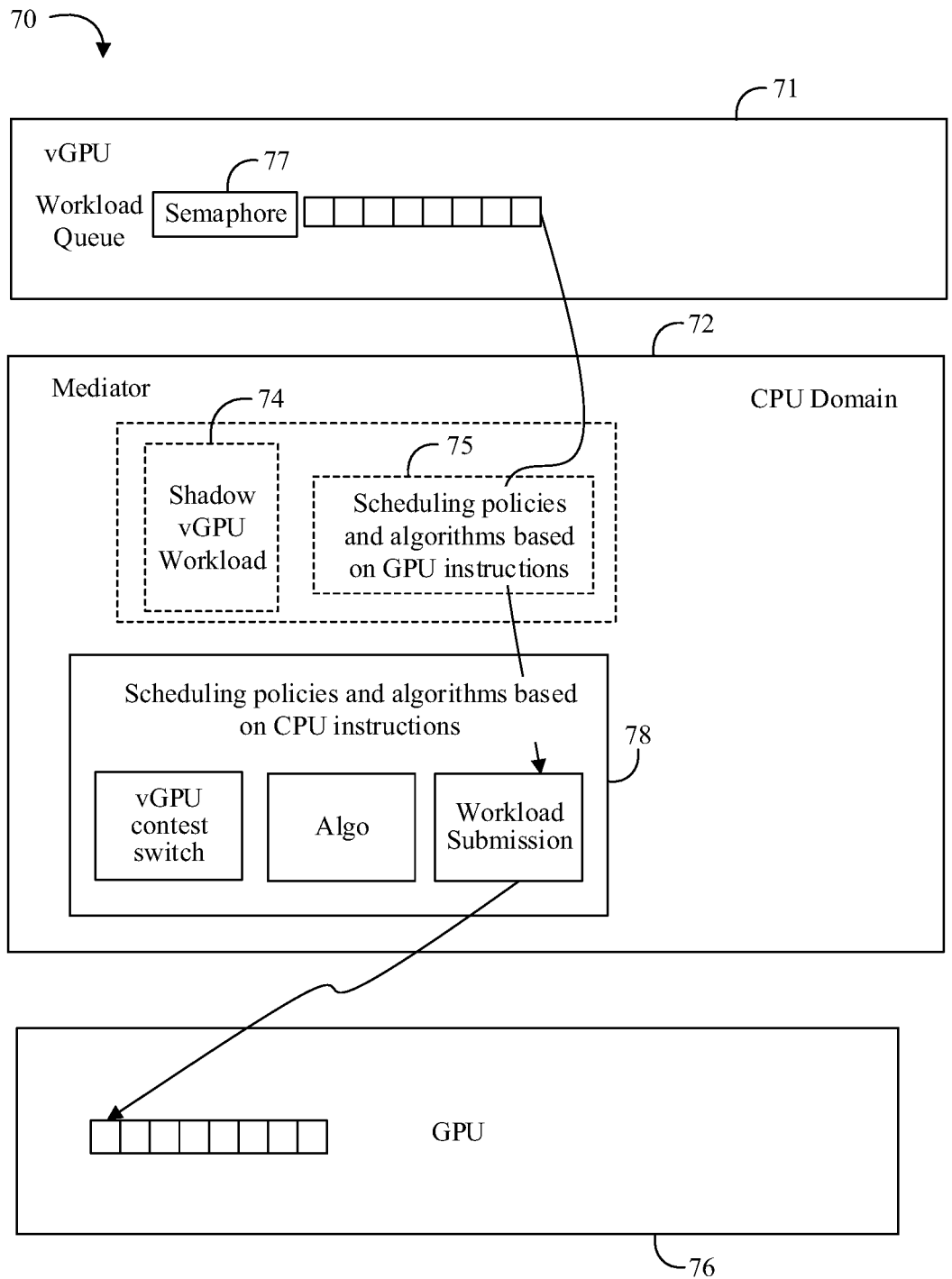
FIG. 7 is a block diagram of another example of an electronic processing system according to an embodiment.

Turning now to FIG. 7, an embodiment of an electronic processing system 70 may include one or more vGPUs 71, a mediator 72 (e.g., in the CPU domain), a shadow vGPU workload 74 and GPU command-based scheduling policies 75 (e.g., in the GPU domain), a CPU command-based version 78 of scheduling policies and algorithms, and a GPU 76, communicatively coupled as shown. FIG. 7, shows an example of vGPU scheduling by a mediator. To append a new vGPU workload into the workload queue, the mediator 72 may take a GPU semaphore 77 and then check if there is an active scheduling point in the GPU pipeline. If the GPU 76 is active, the mediator 72 may just append the new vGPU workload at the end of workload queue and release the semaphore 77. If the GPU 76 is idle, the mediator 72 may execute the CPU version 78 of scheduling algorithms and policies, and then load the workload into the HW execution queue.

Figure 8A:
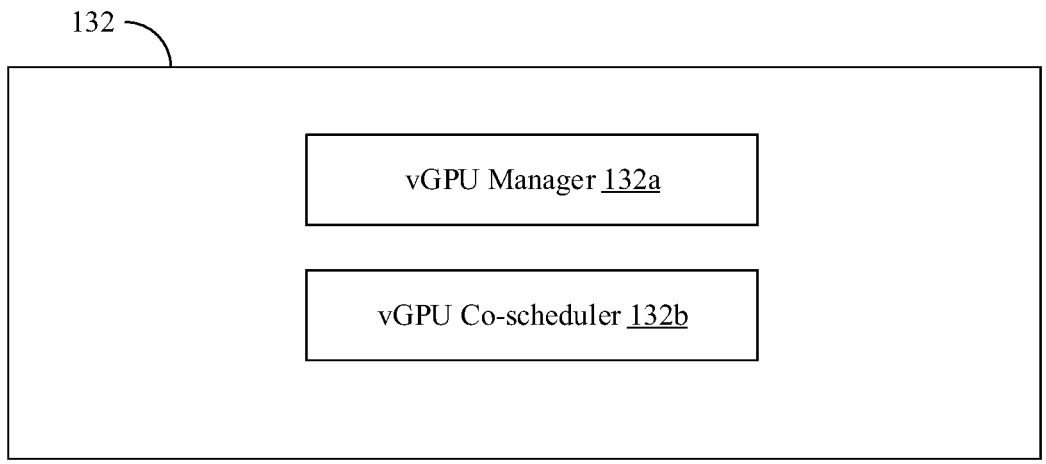
FIGS. 8A and 8B are block diagrams of examples of virtual machine manager apparatuses according to embodiments.

FIG. 8A shows a virtual machine manager apparatus 132 (132*a*-132*b*) that may implement one or more aspects of the method 30 (FIGS. 3A to 3C) and/or the various process flows discussed in connection with FIGS. 4 through 7. The virtual machine manager apparatus 132, which may include logic instructions, configurable logic, fixed-functionality hardware logic, may be readily substituted for all or portions of the system 10 (FIG. 1), the system 42 (FIG. 4), the system 50 (FIG. 5), the system 60 (FIG. 6), and/or the system 70 (FIG. 7), already discussed. A vGPU manager 132*a* may include technology to manage one or more vGPUs. A vGPU co-scheduler 132*b* may include technology to co-schedule the one or more vGPUs based on both general processor instructions and graphics processor instructions. In some embodiments, the vGPU manager 132*a* may be further configured to map schedule information into a graphics memory space, and share the mapped schedule information in the graphics memory space between a general processor and a graphics processor. For example, the schedule information may include one or more of workload queue information and schedule account information. In some embodiments, the vGPU co-scheduler 132*b* may be further configured to generate a shadow virtual graphics processor workload, and insert a graphics processor schedule stub at the end of the shadow virtual graphics processor workload. For example, the vGPU co-scheduler 132*b* may be configured to co-schedule based on graphics processor instructions when the graphics processor schedule stub is reached in the workload, and update schedule account information in the graphics memory space based on one or more of graphics memory space access instructions and graphics processor pipeline instructions. The vGPU co-scheduler 132*b* may also be configured to co-schedule based on general processor instruction after the graphics processor becomes idle.

Figure 8B:
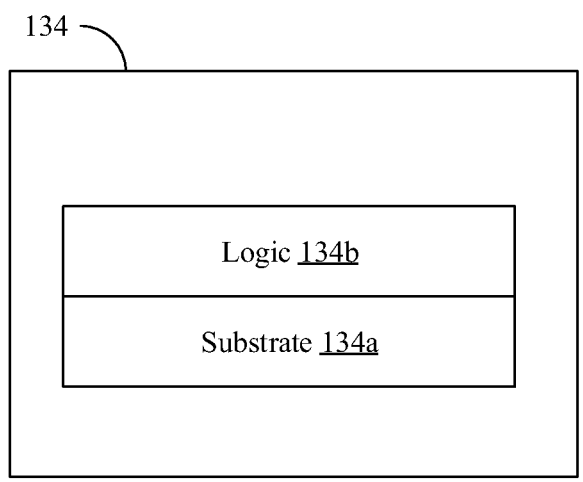

Turning now to FIG. 8B, virtual machine manager apparatus 134 (134*a*, 134*b*) is shown in which logic 134*b* (e.g., transistor array and other integrated circuit/IC components) is coupled to a substrate 134*a* (e.g., silicon, sapphire, gallium arsenide). The logic 134*b* may generally implement one or more aspects of the method 30 (FIGS. 3A to 3C) and/or the various process flows discussed in connection with FIGS. 4 through 7. Thus, the logic 134*b* may manage one or more vGPUs, and co-schedule the one or more vGPUs based on both general processor instructions and graphics processor instructions. In some embodiments, the logic 134*b* may be further configured to map schedule information into a graphics memory space, and share the mapped schedule information in the graphics memory space between a general processor and a graphics processor. For example, the schedule information may include one or more of workload queue information and schedule account information. In some embodiments, the logic 134*b* may be further configured to generate a shadow virtual graphics processor workload, and insert a graphics processor schedule stub at the end of the shadow virtual graphics processor workload. For example, the logic 134*b* may be configured to co-schedule based on graphics processor instructions when the graphics processor schedule stub is reached in the workload, and update schedule account information in the graphics memory space based on one or more of graphics memory space access instructions and graphics processor pipeline instructions. The logic 134*b* may also be configured to co-schedule based on general processor instruction after the graphics processor becomes idle. In one example, the apparatus 134 is a semiconductor die, chip and/or package.

Figure 9:
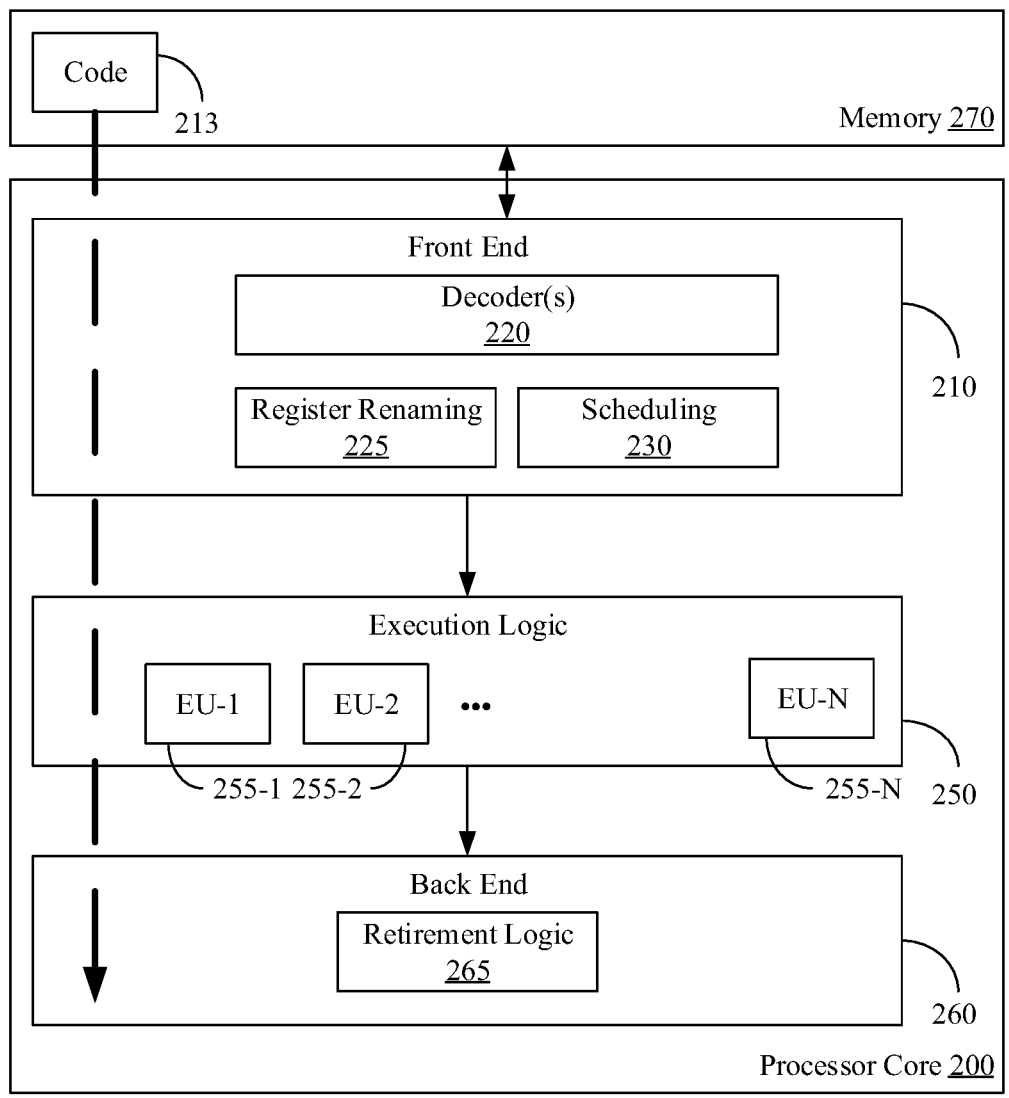
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIGS. 3A to 3C) and/or the various process flows discussed in connection with FIGS. 4 through 7, already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
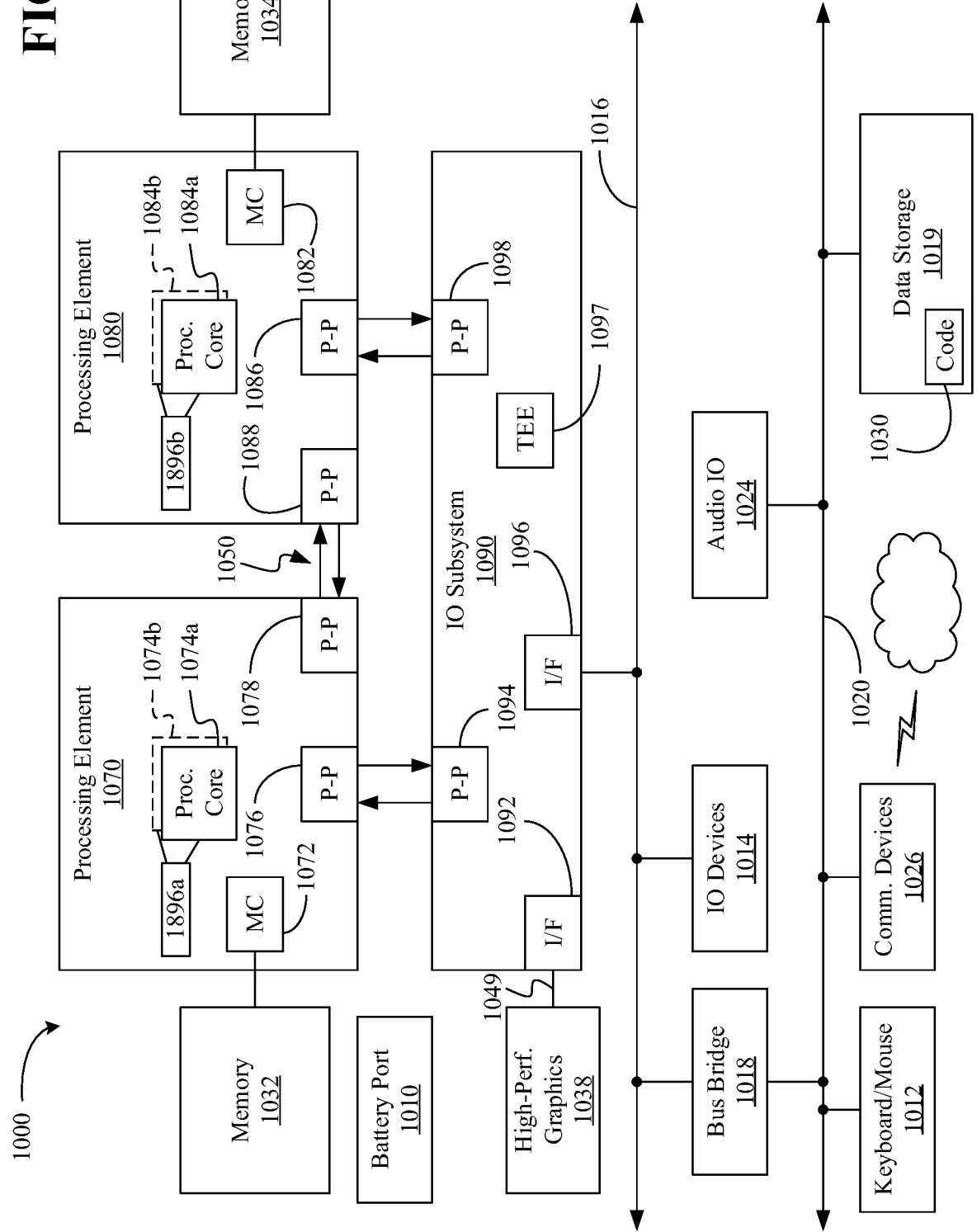
FIG. 10 is a block diagram of an example of a system according to an embodiment.

Referring now to FIG. 10, shown is a block diagram of a system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 9.

Each processing element 1070, 1080 may include at least one shared cache 1896*a*, 1896*b* (e.g., static random access memory/SRAM). The shared cache 1896*a*, 1896*b* may store data (e.g., objects, instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIGS. 3A to 3C) and/or the various process flows discussed in connection with FIGS. 4 through 7, already discussed, and may be similar to the code 213 (FIG. 9), already discussed. Further, an audio I/O 1024 may be coupled to second bus 1020.

Note that other embodiments are contemplated. For example, instead of the point-to-point architecture of FIG. 10, a system may implement a multi-drop bus or another such communication topology.

Additional Notes and Examples:

Example 1 may include an electronic processing system, comprising a general processor, a graphics processor, memory communicatively coupled to the general processor and the graphics processor, and logic communicatively coupled to the general processor and the graphics processor to manage one or more virtual graphic processor units, and co-schedule the one or more virtual graphic processor units based on both general processor instructions and graphics processor instructions.

Example 2 may include the system of Example 1, wherein the logic is further to map schedule information into a graphics memory space, and share the mapped schedule information in the graphics memory space between the general processor and the graphics processor.

Example 3 may include the system of Example 2, wherein the schedule information includes one or more of workload queue information and schedule account information.

Example 4 may include the system of any of Examples 2 to 3, wherein the logic is further to generate a shadow virtual graphics processor workload, and insert a graphics processor schedule stub at the end of the shadow virtual graphics processor workload.

Example 5 may include the system of Example 4, wherein the logic is further to co-schedule based on graphics processor instructions when the graphics processor schedule stub is reached in the workload, and update schedule account information in the graphics memory space based on one or more of graphics memory space access instructions and graphics processor pipeline instructions.

Example 6 may include the system of Example 5, wherein the logic is further to co-schedule based on general processor instruction after the graphics processor becomes idle.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to manage one or more virtual graphic processor units, and co-schedule the one or more virtual graphic processor units based on both general processor instructions and graphics processor instructions.

Example 8 may include the apparatus of Example 7, wherein the logic is further to map schedule information into a graphics memory space, and share the mapped schedule information in the graphics memory space between a general processor and a graphics processor.

Example 9 may include the apparatus of Example 8, wherein the schedule information includes one or more of workload queue information and schedule account information.

Example 10 may include the apparatus of any of Examples 8 to 9, wherein the logic is further to generate a shadow virtual graphics processor workload, and insert a graphics processor schedule stub at the end of the shadow virtual graphics processor workload.

Example 11 may include the apparatus of Example 10, wherein the logic is further to co-schedule based on graphics processor instructions when the graphics processor schedule stub is reached in the workload, and update schedule account information in the graphics memory space based on one or more of graphics memory space access instructions and graphics processor pipeline instructions.

Example 12 may include the apparatus of Example 11, wherein the logic is further to co-schedule based on general processor instruction after the graphics processor becomes idle.

Example 13 may include the apparatus of any of Examples 7 to 12, wherein the logic coupled to the one or more substrates includes transistor channel regions that are positioned within the one or more substrates.

Example 14 may include a method of co-scheduling a virtual graphics processor, comprising managing one or more virtual graphic processor units, and co-scheduling the one or more virtual graphic processor units based on both general processor instructions and graphics processor instructions.

Example 15 may include the method of Example 14, further comprising mapping schedule information into a graphics memory space, and sharing the mapped schedule information in the graphics memory space between a general processor and a graphics processor.

Example 16 may include the method of Example 15, wherein the schedule information includes one or more of workload queue information and schedule account information.

Example 17 may include the method of any of Examples 15 to 16, further comprising generating a shadow virtual graphics processor workload, and inserting a graphics processor schedule stub at the end of the shadow virtual graphics processor workload.

Example 18 may include the method of Example 17, further comprising co-scheduling based on graphics processor instructions when the graphics processor schedule stub is reached in the workload, and updating schedule account information in the graphics memory space based on one or more of graphics memory space access instructions and graphics processor pipeline instructions.

Example 19 may include the method of Example 18, further comprising co-scheduling based on general processor instruction after the graphics processor becomes idle.

Example 20 may include at least one computer readable storage medium, comprising a set of instructions, which when executed by a computing device, cause the computing device to manage one or more virtual graphic processor units, and co-schedule the one or more virtual graphic processor units based on both general processor instructions and graphics processor instructions.

Example 21 may include the at least one computer readable storage medium of Example 20, comprising a further set of instructions, which when executed by the computing device, cause the computing device to map schedule information into a graphics memory space, and share the mapped schedule information in the graphics memory space between a general processor and a graphics processor.

Example 22 may include the at least one computer readable storage medium of Example 21, wherein the schedule information includes one or more of workload queue information and schedule account information.

Example 23 may include the at least one computer readable storage medium of any of Examples 21 to 22, comprising a further set of instructions, which when executed by the computing device, cause the computing device to generate a shadow virtual graphics processor workload, and insert a graphics processor schedule stub at the end of the shadow virtual graphics processor workload.

Example 24 may include the at least one computer readable storage medium of Example 23, comprising a further set of instructions, which when executed by the computing device, cause the computing device to co-schedule based on graphics processor instructions when the graphics processor schedule stub is reached in the workload, and update schedule account information in the graphics memory space based on one or more of graphics memory space access instructions and graphics processor pipeline instructions.

Example 25 may include the at least one computer readable storage medium of Example 24, comprising a further set of instructions, which when executed by the computing device, cause the computing device to co-schedule based on general processor instruction after the graphics processor becomes idle.

Example 26 may include a virtual machine manager apparatus, comprising means for managing one or more virtual graphic processor units, and means for co-scheduling the one or more virtual graphic processor units based on both general processor instructions and graphics processor instructions.

Example 27 may include the apparatus of Example 26, further comprising means for mapping schedule information into a graphics memory space, and means for sharing the mapped schedule information in the graphics memory space between a general processor and a graphics processor.

Example 28 may include the apparatus of Example 27, wherein the schedule information includes one or more of workload queue information and schedule account information.

Example 29 may include the apparatus of any of Examples 27 to 28, further comprising means for generating a shadow virtual graphics processor workload, and means for inserting a graphics processor schedule stub at the end of the shadow virtual graphics processor workload.

Example 30 may include the apparatus of Example 29, further comprising means for co-scheduling based on graphics processor instructions when the graphics processor schedule stub is reached in the workload, and means for updating schedule account information in the graphics memory space based on one or more of graphics memory space access instructions and graphics processor pipeline instructions.

Example 31 may include the apparatus of Example 30, further comprising means for co-scheduling based on general processor instruction after the graphics processor becomes idle.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a general processor;
a graphics processor;
memory communicatively coupled to the general processor and the graphics processor; and
logic communicatively coupled to the general processor and the graphics processor to:
manage one or more virtual graphic processor units,
map schedule information into a graphics memory space, wherein the schedule information includes schedule account information,
co-schedule the one or more virtual graphic processor units based on both general processor instructions and graphics processor instructions,
co-schedule the one or more virtual graphic processor units based on the graphics processor instructions when a graphics processor schedule stub inserted at an end of a virtual graphics processor workload is reached, and
update the schedule account information in the graphics memory space based on one or more of graphics memory space access instructions and graphics processor pipeline instructions, wherein the schedule account information is associated with scheduling policies implemented by graphics processor commands.

2. The system of claim 1, wherein the logic is further to:
share the schedule information in the graphics memory space between the general processor and the graphics processor.

3. The system of claim 2, wherein the schedule information includes workload queue information.

4. The system of claim 2, wherein the logic is further to:
generate the virtual graphics processor workload to be a shadow virtual graphics processor workload; and
insert the graphics processor schedule stub at the end of the shadow virtual graphics processor workload.

5. The system of claim 1, wherein the logic is further to:
co-schedule based on the general processor instruction after the graphics processor becomes idle.

6. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
manage one or more virtual graphic processor units,
map schedule information into a graphics memory space, wherein the schedule information includes schedule account information,
co-schedule the one or more virtual graphic processor units based on both general processor instructions and graphics processor instructions,
co-schedule the one or more virtual graphic processor units based on the graphics processor instructions when a graphics processor schedule stub inserted at an end of a virtual graphics processor workload is reached and
update the schedule account information in the graphics memory space based on one or more of graphics memory space access instructions and graphics processor pipeline instructions, wherein the schedule account information is associated with scheduling policies implemented by graphics processor commands.

7. The apparatus of claim 6, wherein the logic is further to:
share the schedule information in the graphics memory space between a general processor and a graphics processor.

8. The apparatus of claim 7, wherein the schedule information includes workload queue information.

9. The apparatus of claim 7, wherein the logic is further to:
generate the virtual graphics processor workload to be a shadow virtual graphics processor workload; and
insert the graphics processor schedule stub at the end of the shadow virtual graphics processor workload.

10. The apparatus of claim 6, wherein the logic is further to:
co-schedule based on the general processor instructions after a graphics processor becomes idle.

11. The apparatus of claim 6, wherein the logic coupled to the one or more substrates includes transistor channel regions that are positioned within the one or more substrates.

12. A method of co-scheduling a virtual graphics processor, comprising:
managing one or more virtual graphic processor units;
mapping schedule information into a graphics memory space, wherein the schedule information includes schedule account information;
co-scheduling the one or more virtual graphic processor units based on both general processor instructions and graphics processor instructions;
co-scheduling the one or more virtual graphic processor units based on the graphics processor instructions when a graphics processor schedule stub inserted at an end of a virtual graphics processor workload is reached; and
updating the schedule account information in the graphics memory space based on one or more of graphics memory space access instructions and graphics processor pipeline instructions, wherein the schedule account information is associated with scheduling policies implemented by graphics processor commands.

13. The method of claim 12, further comprising:
sharing the schedule information in the graphics memory space between a general processor and a graphics processor.

14. The method of claim 13, wherein the schedule information includes workload queue information.

15. The method of claim 13, further comprising:
generating the virtual graphics processor workload to be a shadow virtual graphics processor workload; and
inserting the graphics processor schedule stub at the end of the shadow virtual graphics processor workload.

16. The method of claim 12, further comprising:
co-scheduling based on the general processor instructions after a graphics processor becomes idle.

17. At least one non-transitory computer readable storage medium, comprising a set of instructions, which when executed by a computing device, cause the computing device to:
manage one or more virtual graphic processor units;
map schedule information into a graphics memory space, wherein the schedule information includes schedule account information;
co-schedule the one or more virtual graphic processor units based on both general processor instructions and graphics processor instructions;
co-schedule the one or more virtual graphic processor units based on the graphics processor instructions when a graphics processor schedule stub inserted at an end of a virtual graphics processor workload is reached; and update the schedule account information in the graphics memory space based on one or more of graphics memory space access instructions and graphics processor pipeline instructions, wherein the schedule account information is associated with scheduling policies implemented by graphics processor commands.

18. The at least one non-transitory computer readable storage medium of claim 17, comprising a further set of instructions, which when executed by the computing device, cause the computing device to:
share the schedule information in the graphics memory space between a general processor and a graphics processor.

19. The at least one non-transitory computer readable storage medium of claim 18, wherein the schedule information includes workload queue information.

20. The at least one non-transitory computer readable storage medium of claim 18, comprising a further set of instructions, which when executed by the computing device, cause the computing device to:
generate the virtual graphics processor workload to be a shadow virtual graphics processor workload; and
insert the graphics processor schedule stub at the end of the shadow virtual graphics processor workload.

21. The at least one non-transitory computer readable storage medium of claim 17, comprising a further set of instructions, which when executed by the computing device, cause the computing device to:
co-schedule based on the general processor instructions after a graphics processor becomes idle.

\* \* \* \* \*